United States Patent
Rohrbough et al.

(10) Patent No.: US 10,452,738 B1
(45) Date of Patent: Oct. 22, 2019

(54) COORDINATING IN-FRAME CONTENT WITH PAGE CONTENT IN APPLICATIONS

(71) Applicant: United Services Automobile Association (USAA), San Antonio, TX (US)

(72) Inventors: Richard R. Rohrbough, Boerne, TX (US); Jason Paul Hendry, Selma, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/899,589

(22) Filed: Feb. 20, 2018

Related U.S. Application Data

(60) Provisional application No. 62/461,318, filed on Feb. 21, 2017.

(51) Int. Cl.
    *G06F 17/00* (2019.01)
    *G06F 16/957* (2019.01)
    *G06F 16/904* (2019.01)
    *G06F 16/954* (2019.01)
    *G06F 16/958* (2019.01)

(52) U.S. Cl.
    CPC .......... *G06F 16/957* (2019.01); *G06F 16/904* (2019.01); *G06F 16/954* (2019.01); *G06F 16/958* (2019.01)

(58) Field of Classification Search
    CPC ......... G06F 17/30899; G06F 17/30873; G06F 17/3089; G06F 17/30994; G06F 16/904; G06F 16/954; G06F 16/957; G06F 16/985; G06F 16/958
    USPC .............................. 715/205, 209, 234
    See application file for complete search history.

(56) References Cited

U.S. PATENT DOCUMENTS

| | | | |
|---|---|---|---|
| 6,593,944 B1* | 7/2003 | Nicolas | G06F 16/9577 715/744 |
| 7,640,512 B1* | 12/2009 | Appling | G06F 16/9577 715/771 |
| 9,405,425 B1* | 8/2016 | Weston | G06F 3/048 |
| 9,454,618 B1* | 9/2016 | Chen | G06F 16/951 |
| 2002/0073166 A1* | 6/2002 | Lynch | G06Q 30/02 709/217 |

(Continued)

OTHER PUBLICATIONS

Hill et al., System Architecture Directions for Networked Sensors, ACM 2000, pp. 93-104. (Year: 2000).*

(Continued)

*Primary Examiner* — Cong-Lac Huynh
(74) *Attorney, Agent, or Firm* — Fish & Richardson P.C.

(57) ABSTRACT

Implementations of the present disclosure are directed to coordinating content between a page and a frame embedded in the page, and include establishing an event listener with the frame, the event listener inducing the frame to provide event messages to the page in response to occurrence of respective events within the frame, receiving a first event message from the frame, the first event message reporting occurrence of a first event, requesting first content from one or more data sources, the first content corresponding to the first event, and updating the page to display the first content therein, the first content corresponding to content displayed in the frame.

18 Claims, 6 Drawing Sheets

(56) References Cited

U.S. PATENT DOCUMENTS

| | | | |
|---|---|---|---|
| 2002/0091738 A1* | 7/2002 | Rohrabaugh | H04L 67/2823 715/249 |
| 2002/0156815 A1* | 10/2002 | Davia | G06F 16/958 715/243 |
| 2004/0111671 A1* | 6/2004 | Lu | G06F 17/30899 715/205 |
| 2005/0160469 A1* | 7/2005 | Chiu | H04N 21/23418 725/112 |
| 2006/0053224 A1* | 3/2006 | Subramaniam | H04L 67/1095 709/227 |
| 2006/0064467 A1* | 3/2006 | Libby | G06F 17/30887 709/217 |
| 2006/0230335 A1* | 10/2006 | Fischer | G06F 8/38 715/273 |
| 2009/0070190 A1* | 3/2009 | Gorty | G06Q 30/02 705/14.6 |
| 2010/0179873 A1* | 7/2010 | Li | G06Q 30/02 705/14.49 |
| 2012/0198361 A1* | 8/2012 | Ganimasty | G06F 17/30899 715/760 |
| 2012/0254292 A1* | 10/2012 | Newton | H04L 67/36 709/203 |
| 2012/0254722 A1* | 10/2012 | Newton | G06F 17/30899 715/234 |
| 2013/0179767 A1* | 7/2013 | Bajric | G06F 17/30902 715/234 |
| 2015/0142920 A1* | 5/2015 | McGushion | H04L 67/06 709/219 |
| 2015/0347615 A1* | 12/2015 | McGushion | H04L 67/02 715/234 |
| 2017/0134514 A1 | 5/2017 | Greifeneder | |
| 2018/0081980 A1* | 3/2018 | Ross | G06F 17/30893 |
| 2018/0239498 A1* | 8/2018 | Young | G06F 3/0481 |
| 2018/0367572 A1* | 12/2018 | Frisbie | H04L 67/34 |

OTHER PUBLICATIONS

Pontelli et al., Navigation of HTML Tables, Frames, and XML Fragments, ACM 2002, pp. 25-32. (Year: 2002).*

* cited by examiner

COORDINATING IN-FRAME CONTENT WITH PAGE CONTENT IN APPLICATIONS

CROSS-REFERENCE TO RELATED APPLICATION

This application claims priority to U.S. Provisional Patent Application Ser. No. 62/461,318, filed on Feb. 21, 2017, which is hereby incorporated by reference into the present disclosure.

BACKGROUND

Entities, such as enterprises, can provide applications to users to enable users to access products, and/or services provided by the enterprise. For example, an enterprise can provide a web application, and/or a mobile application, through which users can access the products, and/or services over a network (e.g., the Internet). In some examples, an application includes a page (e.g., a web page) that displays information to the user, and that provides one or more interfaces, through which the user can interact with the application.

In some instances, an enterprise can partner with a third-party provider to enable user access to one or more products, and/or services of the third-party provider through the application. For example, an interface associated with an application of the third-party provider can be embedded within a page of the application of the enterprise. In this manner, the user can interact with the application of the third-party provider directly through the application of the enterprise.

In some instances, the application of the enterprise displays content, and the application of the third-party provider displays other content. As the user interacts with the application of the third-party provider, the context of the content displayed in the application of the enterprise might no longer correspond to the context of the content displayed in the application of the third-party provider.

SUMMARY

Implementations of the present disclosure are generally directed to coordinating in-frame content with page content in applications. More specifically, implementations of the present disclosure are directed to updating content displayed within a page of an application based on activities, and/or content displayed in a frame that is embedded in the page. In this manner, contexts of the respective content align with one another.

Implementations of the present disclosure can include actions of establishing an event listener with the frame, the event listener inducing the frame to provide event messages to the page in response to occurrence of respective events within the frame, receiving a first event message from the frame, the first event message reporting occurrence of a first event, requesting first content from one or more data sources, the first content corresponding to the first event, and updating the page to display the first content therein, the first content corresponding to content displayed in the frame. Other implementations include corresponding systems, apparatus, and computer programs, configured to perform the actions of the methods, encoded on computer storage devices.

These and other implementations can each optionally include one or more of the following features: actions further include receiving a second event message from the frame, the second event message reporting occurrence of a second event, requesting second content from one or more data sources, the second content corresponding to the second event, and updating the page to display the second content therein, the second content corresponding to content displayed in the frame after occurrence of the second event; updating the page to display the second content includes replacing the first content with the second content; updating the page to display the first content includes updating a document object model (DOM) of the page based on at least a portion of the first content; one or more data sources include one or more of a database, and an advice services infrastructure (ASI); and the page includes a web page displayed in a web browser executed on a client device.

The details of one or more implementations are set forth in the accompanying drawings and the description below. Other features and advantages will be apparent from the description and drawings, and from the claims.

DETAILED DESCRIPTION

Implementations of the present disclosure are generally directed to coordinating in-frame content with page content in applications. More specifically, implementations of the present disclosure are directed to updating content displayed within a page of an application based on activities, and/or content displayed in a frame that is embedded in the page. In some implementations, actions include establishing an event listener with the frame, the event listener inducing the frame to provide event messages to the page in response to occurrence of respective events within the frame, receiving a first event message from the frame, the first event message reporting occurrence of a first event, requesting first content from one or more data sources, the first content corresponding to the first event, and updating the page to display the first content therein, the first content corresponding to content displayed in the frame.

Implementations of the present disclosure are described in further detail herein with reference to an example context. The example context includes a financial services provider (e.g., bank, insurance company) that provides Internet-based products, and/or services to users (e.g., customers). It is contemplated, however, that implementations of the present disclosure can be realized in any appropriate context.

Implementations of the present disclosure are also described in further detail herein with reference to a network-based application provided as a web-application that includes one or more web pages accessed over the Internet, the web-application including a web page having a third-party application embedded therein. It is contemplated, however, that implementations can be realized in other scenarios including, for example, a mobile application having a page, within which a third-party application is embedded.

Figure 1:
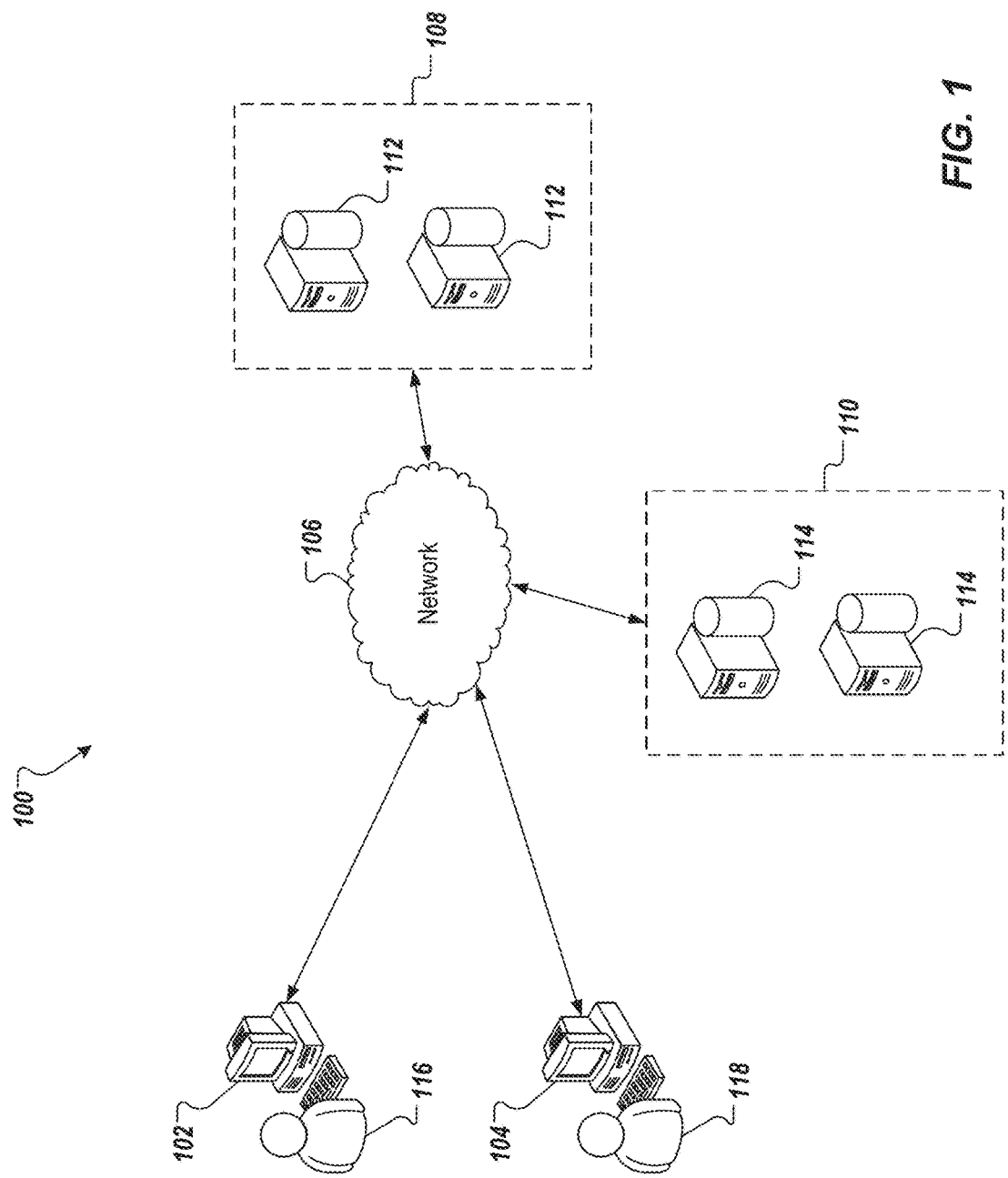
FIG. 1 depicts an example architecture that can be used to execute implementations of the present disclosure.

FIG. 1 depicts an example architecture 100 that can be used to execute implementations of the present disclosure.

In the depicted example, the architecture 100 includes one or more client devices 102, 104, a server system 108, a server system 110, and a network 106. The server systems 108, 110 each include multiple servers (e.g., processors, memory) and databases (collectively referenced as 112, 114, respectively). In the context of the present disclosure, the servers 112, 114 are respective hardware and/or software platforms. In the depicted example, respective users 116, 118 interact with the client devices 102, 104. In an example context, the users 112, 114 can include users (e.g., customers, investors), who interact with a crypto-currency platform, as described in further detail herein.

In some examples, the client devices 102, 104 can communicate with the server systems 108, 110 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server 112, 114 includes at least one server and at least one data store. In the example of FIG. 1, each server 112, 114 is intended to represent various forms of servers including, but not limited to a web server, an application server, a proxy server, a network server, and/or a server pool. In general, servers accept requests for application services and provide such services to any number of client devices (e.g., the client devices 102, 104 over the network 106).

In accordance with the context of the present disclosure, one or more servers 112, 114 of the server systems 108, 110 can host respective web-based applications that can be accessed by users 116, 118 using the client devices 102, 104, respectively. For example, the server system 108 can host a web-application provided by an enterprise, the web-application including one or more web pages that can be displayed in web browsers executed on the client devices 102, 104. The server system 110 can host a web-application provided by a third-party provider, the web-application including one or more web pages that can be displayed in web browsers executed on the client devices 102, 104.

In accordance with implementations of the present disclosure, the web-application of the enterprise can embed the web-application of the third-party provider. In this manners, the users 116, 118 can access products, and/or services of the third-party provider (i.e., the web-application of the third-party provider) through the web-application of the enterprise. For example, and as described in further detail herein, the web-application of the third-party provider can be embedded within one or more web pages of the web application of the enterprise.

In the example context, the web-application of the enterprise can enable the users 116, 118 to access one or more accounts (e.g., savings, checking, insurance) held by the enterprise on behalf of the users 116, 118. The web-application of the third-party service provider can provide one or more financial tools based on the one or more accounts (e.g., an account summary tool, a transaction summary tool, a spending analysis tool, a budgeting tool, a trends tool).

In accordance with implementations of the present disclosure, and as described in detail herein, as the user 116, 118 navigates a financial tool embedded in a web page of the web-application of the enterprise, content that is displayed within the financial tool changes. Implementations of the present disclosure enable content displayed within the web page, but external to the financial tool to change in response to content changes within the financial tool. In this manner, contexts of the respective content align with one another.

Figure 2:
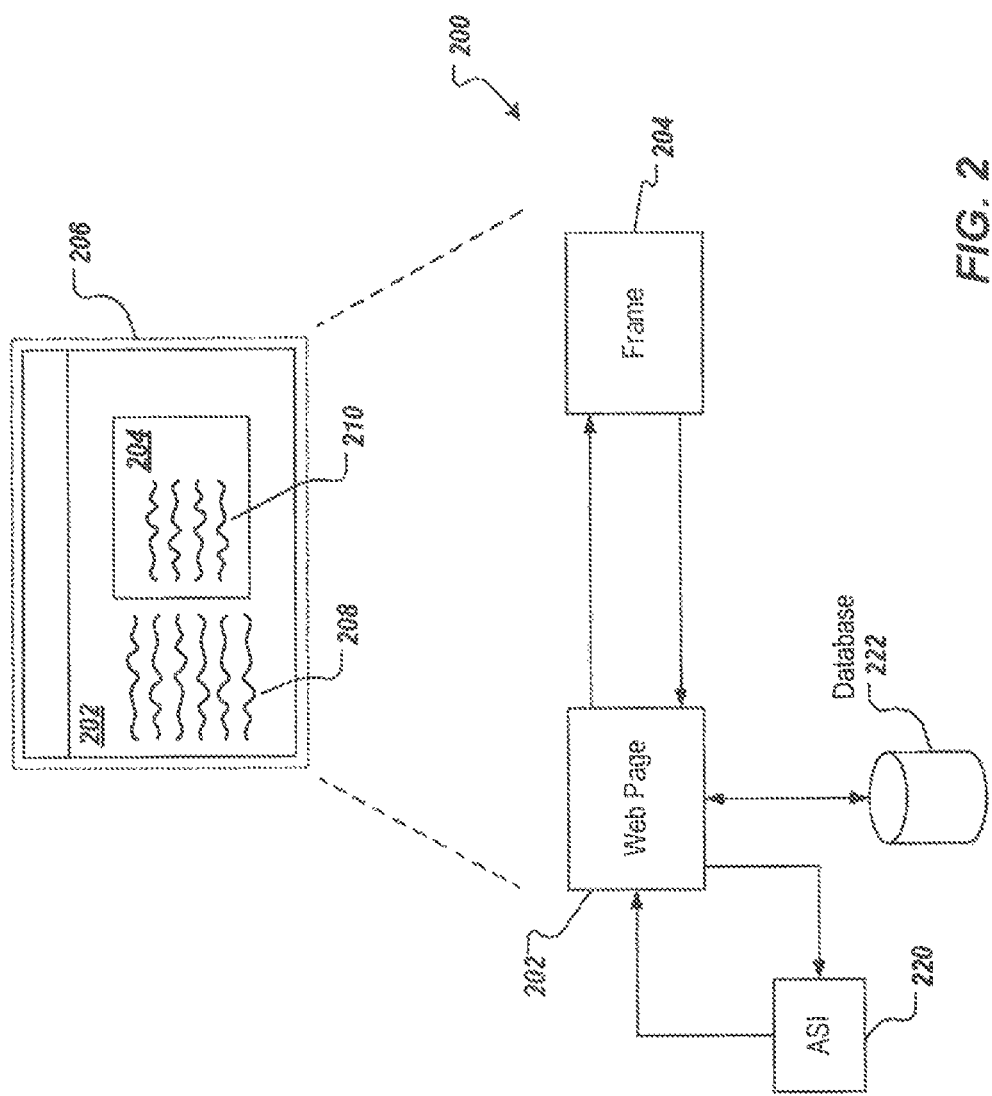
FIG. 2 depicts an example architecture in accordance with implementations of the present disclosure.

FIG. 2 depicts an example architecture 200 in accordance with implementations of the present disclosure. The example architecture 200 enables content of a web page 202, and a frame 204 to be coordinated. For example, a web browser 206 executing on a client device (e.g., the client devices 102, 104 of FIG. 1) displays the web page 202 with the frame embedded therein. In accordance with the example content, the web page 202 can be provided by a financial services enterprise (FSE) to enable users to access one or more accounts (e.g., savings, checking, insurance) held by the enterprise, and the frame 204 can enable interaction with financial tools (e.g., an account summary tool, a transaction summary tool, a spending analysis tool, a budgeting tool, a trends tool) of a third-party provider (TPP). The web page 202 can display content 208, and the frame 204 can display content 210. In some examples, the content 208 can include user-specific content (e.g., account information specific to the user), and/or general content (e.g., financial advice). In some examples, the content 210 can include user-specific content (e.g., summaries/analyses of account information specific to the user), and/or general content.

In the example of FIG. 2, the example architecture 200 also includes an advice services infrastructure (ASI) 220, and a database 222. In some examples, the ASI 220 determines at least a portion of the content 208 that is to be displayed in the web page 202. In some examples, the database 222 stores at least a portion of the content 208 that 20 is to be displayed in the web page 202. For example, the ASI 220 can determine that budgeting advice is to be displayed as at least a portion of the content 208. Consequently, the web page 202 can receive the budgeting advice from the database 222 for display as at least a portion of the content 208. In some examples, the content 210 displayed in the frame 204 is provided by one or more back-end systems of the third-party provider (e.g., 25 the server system 110 of FIG. 1).

In some implementations, the web page 202 has an underlying document object model (DOM) that defines the appearance, and/or functionality of the web page 202. In some examples, a DOM can be described as a cross-platform, language-independent application programming interface (API) that treats an electronic document (e.g., HTML, XHTML, XML document) as a free structure including nodes as respective objects, each object representing a part of the electronic document. In some examples, objects of the DOM can be programmatically manipulated to provide visible, and/or functional changes that are reflected in the display of the electronic document (e.g., as the web page 202 in the web browser 206).

In some implementations, the underlying electronic document, and corresponding DOM, of the web page 202 includes instructions to embed the frame 204 therein, and includes an end-point (e.g., uniform resource indicator (URI), such as a uniform resource locator (URL)) that points to the application of the third-party provider that is to be displayed within the frame 204. Accordingly, the web page 202 receives user interfaces (UIs) and content of the third-party service provider based on the end-point, and serves (displays) the UIs and content in the frame 204. For example, the web page 202 can provide a request (e.g., FSP.launchTargetURI[URI//target=budget]), and in response, receive an electronic document from the third-party provider, which electronic document includes the UIs, and content to be displayed in the frame 204.

As described in further detail herein, implementations of the present disclosure enable user navigation within the frame 204 to be tracked by the web page 202 to enable updating of the content 208. In this manner, the context of the content 208 (e.g., budgeting) can align with (e.g., be the same as) the context of the content 210, as the content 210 changes in response to user navigation within the frame 204 (e.g., the user moving from a budgeting tool to a financial planning tool).

In some implementations, the web page 202 establishes an event listener with the frame 204, such that events occurring within the frame 204 (e.g., a navigation event) is reported to the web page 202. For example, the web page 202 can establish an event listener by transmitting an event listener message to the frame 204 (e.g., window.addEventListener{messageFunction, targetDomain, transferObject}). The frame 204 can establish an event listener that reports events to the web page 202.

In some implementations, upon initial display of content 210 within the frame 204, the frame 204 provides a message (e.g., TPP.postMessage[ ]) that indicates the initial context of the content 210 (e.g., budgeting). The web page 202 can receive the message (e.g., FSE.receiveMessage[ ]), and can access one or more of the ASI 220, and the database 222 to update the content 208. For example, in response to a message indicating that the content 210 corresponds to budgeting, the web page 202 can access the database 222 to receive budget-related data for the particular user (e.g., based on credentials (username, password) the user provided to log into the web page 202), and can transmit a request to the ASI 220 for content related to budgeting. In some examples, the DOM of the web page 202 is updated based on content received to update the content 208 displayed in the web page 202.

In some examples, in response to the user navigating within the frame 204 (e.g., navigating from a budgeting tool to a retirement planning tool) the frame 204 provides a message (e.g., TPP.postMessage[ ]) that indicates the updated context of the content 210 (e.g., retirement planning). The web page 202 can receive the message (e.g., FSE.receiveMessage[ ]), and can access one or more of the ASI 220, and the database 222 to update the content 208. For example, in response to a message indicating that the content 210 corresponds to retirement planning, the web page 202 can access the database 222 to receive data related to retirement planning for the particular user, and can transmit a request to the ASI 220 for content related to retirement planning. In some examples, the DOM of the web page 202 is updated based on content received to update the content 208 displayed in the web page 202.

This process can repeat in response to user interactions (e.g., navigation) within the frame 204 to continuously update the content 208 in response to changes in the context of the content 210 to ensure that the contexts align (e.g., if budget-related content is displayed in the frame 204, budget-related content is displayed in the web page 202; if retirement-related content is displayed in the frame 204, retirement-related content is displayed in the web page 202).

Figure 3A:
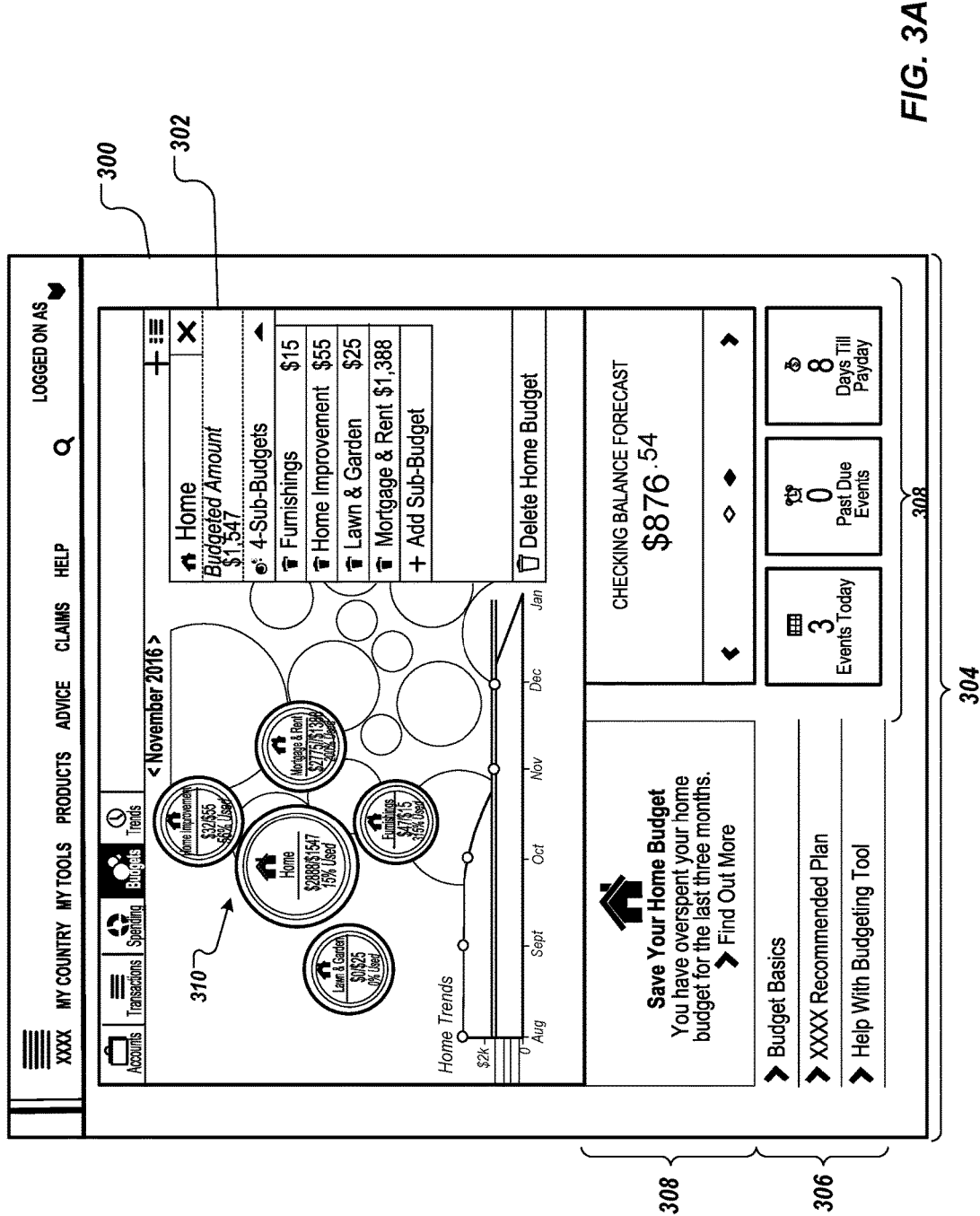
FIGS. 3A-3C depict an example web page in accordance with implementations of the present disclosure.
Figure 3B:
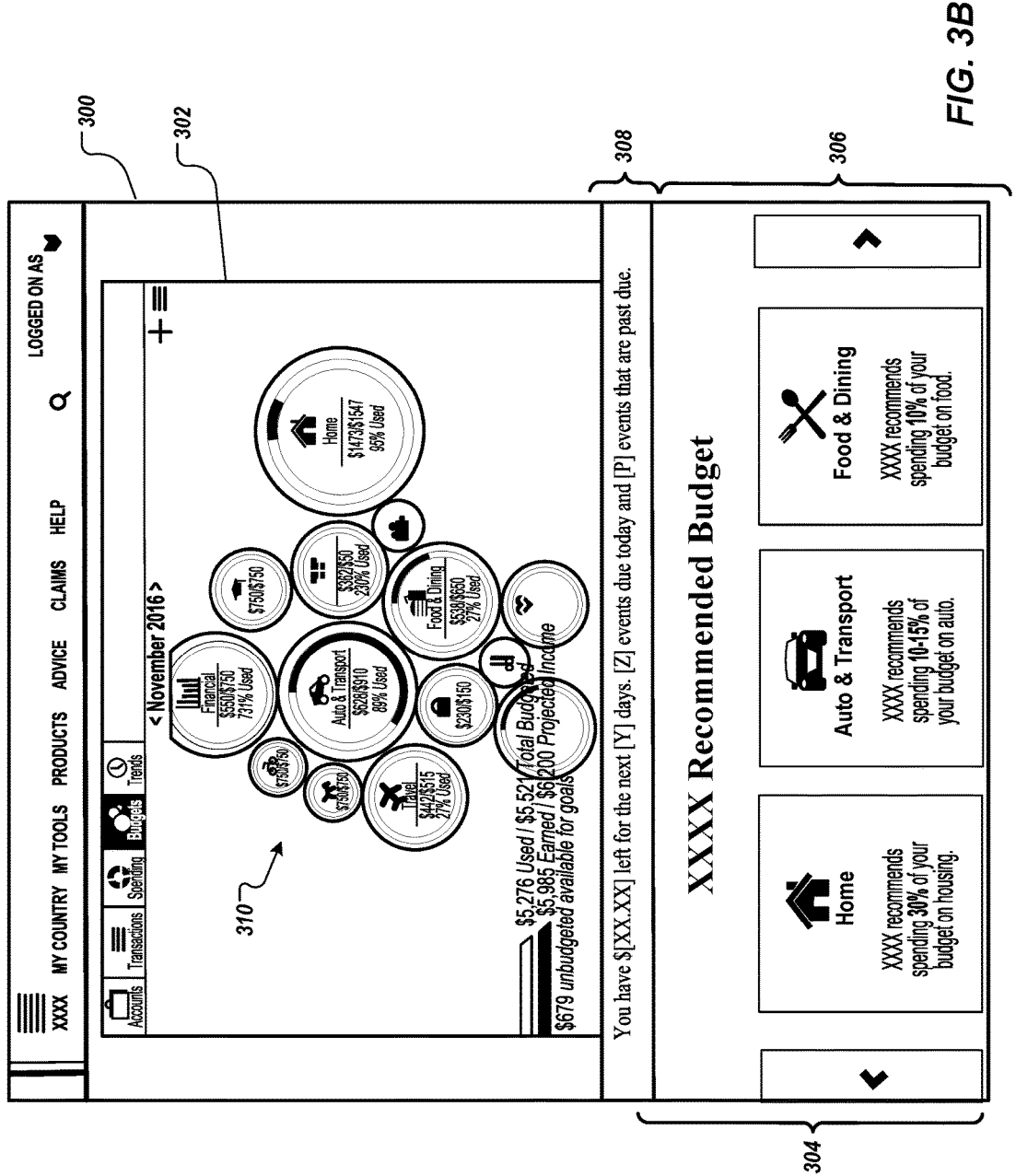
Figure 3C:
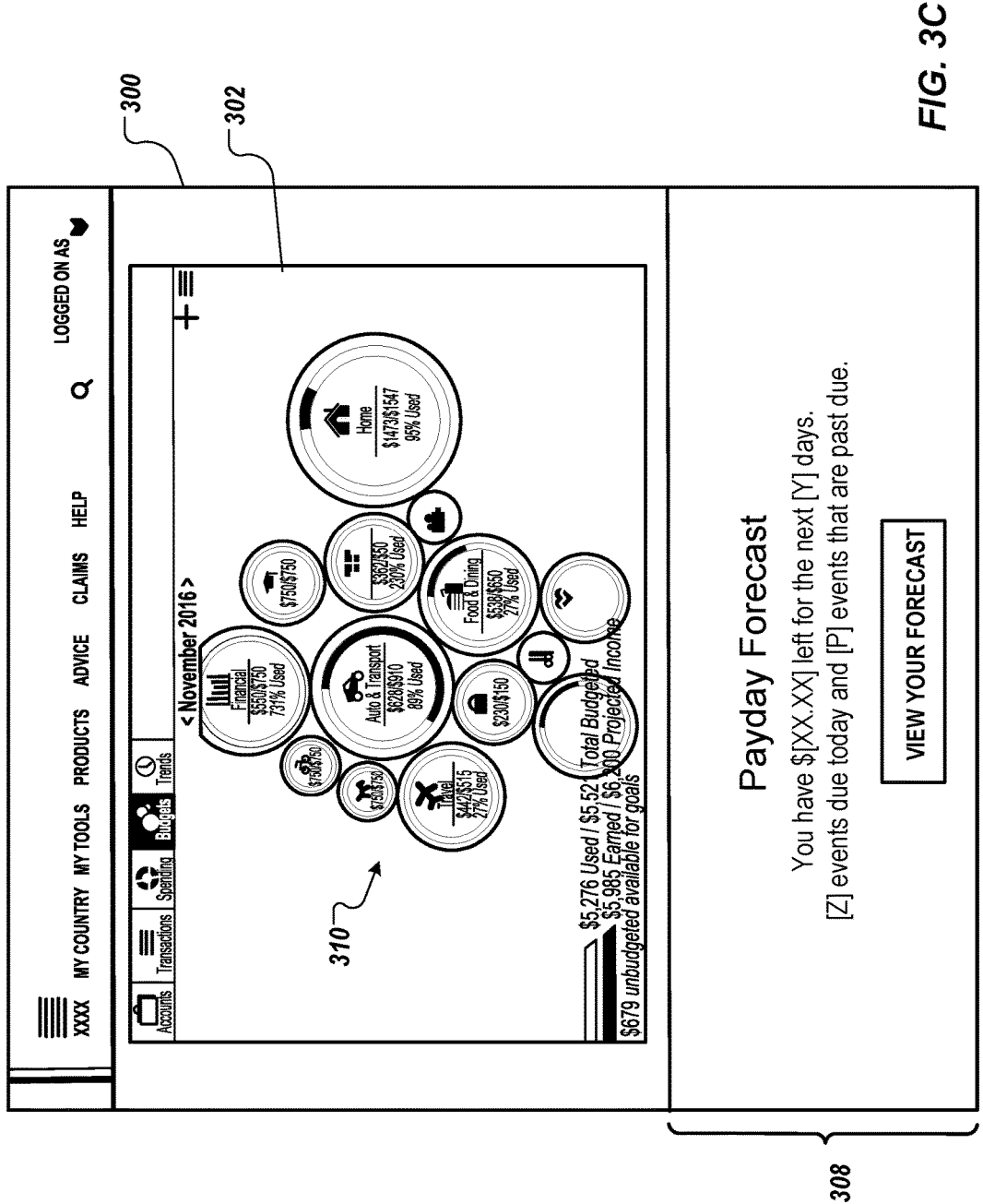

FIGS. 3A-3C depict an example web page 300 in accordance with implementations of the present disclosure. A frame 302 is embedded in within the web page 300. In the examples context, the web page 300 is provided by, or on behalf of a financial services enterprise, and an application accessed through the frame 302 is provided by a third-party provider. In the depicted example, the web page 300 displays content 304 that includes general content 306, and user-specific content 308. In some examples, the general content 306 is consistent across all user's (e.g., the same content 306 is displayed for any user). In some examples, the user-specific content 308 is specific to the user that is logged into the web application providing the web page 300. In the example of FIG. 3A, the user-specific content 308 indicates how much money the user has remaining until a next payday (e.g., $876.54 left for the next 8 days), a number of events (e.g., bill payments) due today, and a number of events (e.g., bill payments) that are past due.

In some implementations, the frame 302 displays content and interfaces provided by the third-party service provider. In this example, the third-party service provider provides financial tools that the user can interact with through the frame 302. In the depicted example, financial tools include an account summary tool, a transaction summary tool, a spending analysis tool, a budgeting tool, a trends tool. In the example of FIG. 3A, the budgeting tool is selected, and the web page 300 displays content 310 reflecting 15 expenditures and budgeting information for the user.

In accordance with implementations of the present disclosure, because the frame 302 is depicting content 310 including budgeting information (e.g., the budgeting tool is selected), the content 304 is associated with budgeting. If, for example, the content 310 of the frame 302 were to change to another context (e.g., net worth, debt pay down) different from budgeting, the content 304 would also change, as described herein, to reflect the same context as the frame 302.

FIGS. 3B and 3C depict other examples of content 304, 306, 308 that can be displayed in the web page 300.

Figure 4:
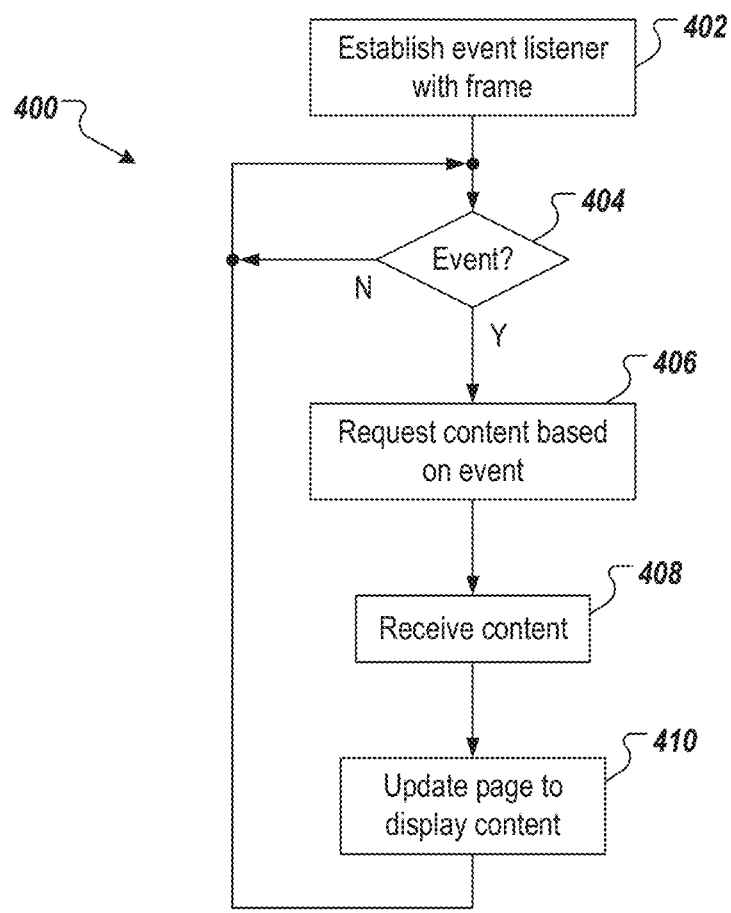
FIG. 4 depicts an example process that can be executed in accordance with implementations of the present disclosure.

FIG. 4 depicts an example process 400 that can be executed in accordance with implementations of the present disclosure. In some examples, the process 400 is provided by one or more computer-executable programs executed by one or more computing devices.

An event listener is established with a frame (402). For example, a page can establish an event listener by transmitting an event listener message to the frame (e.g., window.addEventListener{messageFunction, targetDomain, transferObject}). It is determined whether an event has occurred (404). For example, in response to a user navigating within the frame (e.g., navigating from a budgeting tool to a retirement planning tool), the frame provides a message (e.g., TPP.postMessage[ ]) that indicates the updated context of the content (e.g., retirement planning), and the page can receive the message (e.g., FSE.receiveMessage[ ]). If an event has not occurred, the example process 400 loops back.

If an event has occurred, content is requested based on the event (406). For example, one or more requests can be provided (e.g., to an ASI system, to a user data database). Content is received (408), the page is updated to display the content (410), and the process 400 loops back.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the architectures 100, 200 of FIGS. 1 and 2, respectively, can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs (i.e., one or more modules of computer program instructions) encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware), a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA, an ASIC).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method for coordinating content between a page and a frame embedded in the page, the method being executed by at least one processor and comprising:
    establishing, by the at least one processor, an event listener with the frame, the event listener inducing the frame to provide event messages to the page in response to occurrence of respective events within the frame;
    receiving, by the at least one processor, a first event message from the frame, the first event message reporting occurrence of a first event that causes a display of initial content within the frame, the first event message indicating a context of the initial content;
    in response to receiving the first event message, requesting, by the at least one processor, first content from one or more data sources, the first content being different from the initial content and corresponding to the context of the initial content displayed in the frame; and
    updating, by the at least one processor, a portion of the page outside of the frame to display the first content therein.

2. The method of claim 1, further comprising:
    receiving a second event message from the frame, the second event message reporting occurrence of a second event;
    requesting second content from one or more data sources, the second content corresponding to the second event; and
    updating the portion of the page outside of the frame to display the second content therein, the second content corresponding to content displayed in the frame after occurrence of the second event.

3. The method of claim 2, wherein updating the portion of the page to display the second content comprises replacing the first content with the second content.

4. The method of claim 1, wherein updating the portion of the page to display the first content comprises updating a document object model (DOM) of the page based on at least a portion of the first content.

5. The method of claim 1, wherein one or more data sources comprise one or more of a database, and an advice services infrastructure (ASI).

6. The method of claim 1, wherein the page comprises a web page displayed in a web browser executed on a client device.

7. A non-transitory computer-readable storage medium coupled to one or more processors and having instructions stored thereon which, when executed by the one or more processors, cause the one or more processors to perform operations for coordinating content between a page and a frame embedded in the page, the operations comprising:
    establishing an event listener with the frame, the event listener inducing the frame to provide event messages to the page in response to occurrence of respective events within the frame;
    receiving a first event message from the frame, the first event message reporting occurrence of a first event that causes a display of initial content within the frame, the first event message indicating a context of the initial content;
    in response to receiving the first event message, requesting first content from one or more data sources, the first content being different from the initial content and corresponding to the context of the initial content displayed in the frame; and
    updating a portion of the page outside of the frame to display the first content therein.

8. The computer-readable storage medium of claim 7, wherein operations further comprise:
    receiving a second event message from the frame, the second event message reporting occurrence of a second event;
    requesting second content from one or more data sources, the second content corresponding to the second event; and
    updating the portion of the page to display the second content therein, the second content corresponding to content displayed in the frame after occurrence of the second event.

9. The computer-readable storage medium of claim 8, wherein updating the portion of the page to display the second content comprises replacing the first content with the second content.

10. The computer-readable storage medium of claim 7, wherein updating the portion of the page to display the first content comprises updating a document object model (DOM) of the page based on at least a portion of the first content.

11. The computer-readable storage medium of claim 7, wherein one or more data sources comprise one or more of a database, and an advice services infrastructure (ASI).

12. The computer-readable storage medium of claim 7, wherein the page comprises a web page displayed in a web browser executed on a client device.

13. A system, comprising:
    one or more processors; and
    a computer-readable storage device coupled to the one or more processors and having instructions stored thereon which, when executed by the one or more processors, cause the one or more processors to perform operations for coordinating content between a page and a frame embedded in the page, the operations comprising:
        establishing an event listener with the frame, the event listener inducing the frame to provide event messages to the page in response to occurrence of respective events within the frame;
        receiving a first event message from the frame, the first event message reporting occurrence of a first event that causes a display of initial content within the frame, the first event message indicating a context of the initial content;
        in response to receiving the first event message, requesting first content from one or more data sources, the first content being different from the initial content and corresponding to the context of the initial content displayed in the frame; and
        updating a portion of the page outside of the frame to display the first content therein.

14. The system of claim 13, wherein operations further comprise:
    receiving a second event message from the frame, the second event message reporting occurrence of a second event;
    requesting second content from one or more data sources, the second content corresponding to the second event; and
    updating the portion of the page to display the second content therein, the second content corresponding to content displayed in the frame after occurrence of the second event.

15. The system of claim 14, wherein updating the portion of the page to display the second content comprises replacing the first content with the second content.

16. The system of claim 13, wherein updating the portion of the page to display the first content comprises updating a document object model (DOM) of the page based on at least a portion of the first content.

17. The system of claim 13, wherein one or more data sources comprise one or more of a database, and an advice services infrastructure (ASI).

18. The system of claim 13, wherein the page comprises a web page displayed in a web browser executed on a client device.

\* \* \* \* \*